(12) United States Patent
Tanaka et al.

(10) Patent No.: US 8,287,166 B2
(45) Date of Patent: Oct. 16, 2012

(54) VEHICLE HEADLAMP

(75) Inventors: Yoshiharu Tanaka, Aichi-ken (JP); Akihiro Misawa, Aichi-ken (JP); Tetsuya Arakawa, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 119 days.

(21) Appl. No.: 12/659,767

(22) Filed: Mar. 19, 2010

(65) Prior Publication Data

US 2010/0246205 A1    Sep. 30, 2010

(30) Foreign Application Priority Data

Mar. 24, 2009 (JP) ................ P2009-072605

(51) Int. Cl.
*F60Q 1/00* (2006.01)

(52) U.S. Cl. ............ 362/538; 362/507; 362/249.02; 362/539

(58) Field of Classification Search ......... 362/227, 362/235, 236, 240, 241, 244, 245, 249.01, 362/249.02, 310, 326, 327, 328, 346, 347, 362/465, 475, 507, 538, 539, 540, 543–546, 362/549, 800
See application file for complete search history.

(56) References Cited

U.S. PATENT DOCUMENTS

| | | | | |
|---|---|---|---|---|
| 5,021,930 A * | 6/1991 | Yamada | .......... | 362/539 |
| 5,117,335 A * | 5/1992 | Yamada | .......... | 362/544 |
| 5,611,612 A * | 3/1997 | Choji et al. | .......... | 362/459 |
| 5,681,104 A * | 10/1997 | Chinniah et al. | .......... | 362/538 |
| 6,231,220 B1 * | 5/2001 | Shibuya et al. | .......... | 362/507 |
| 6,334,701 B2 * | 1/2002 | Kodaira et al. | .......... | 362/475 |
| 6,827,470 B2 * | 12/2004 | Sagal et al. | .......... | 362/341 |
| 7,156,544 B2 * | 1/2007 | Ishida | .......... | 362/538 |
| 7,597,465 B2 | 10/2009 | Inaba et al. | | |
| 7,758,218 B2 * | 7/2010 | Mochizuki et al. | .......... | 362/465 |
| 7,794,128 B2 | 9/2010 | Fujiwara et al. | | |
| 7,993,043 B2 * | 8/2011 | Sazuka et al. | .......... | 362/509 |
| 2005/0180158 A1 | 8/2005 | Komatsu | | |
| 2007/0177400 A1 | 8/2007 | Tatsukawa | | |
| 2007/0279927 A1 | 12/2007 | Yamamichi et al. | | |

(Continued)

FOREIGN PATENT DOCUMENTS

CN    1654880 A    8/2005

(Continued)

OTHER PUBLICATIONS

Chinese Office Action dated Mar. 9, 2011, with English translation.

(Continued)

*Primary Examiner* — Hargobind S Sawhney
(74) *Attorney, Agent, or Firm* — McGinn IP Law Group, PLLC

(57) ABSTRACT

A vehicle head lamp comprising a first low beam member including a first light source part; a second low beam member including a second light source part, wherein the first low beam member and the second low beam member are arranged in a vertical direction and are both reflective type; a first frame including a partition, the first frame supporting the first low beam member and the second low beam member, and the partition separating the first low beam member and the second low beam member; and a storage provided in a rear side of the partition, the storage accommodating the first and the second light source parts.

17 Claims, 4 Drawing Sheets

U.S. PATENT DOCUMENTS

2009/0073706 A1* 3/2009 Tatara et al. .................. 362/487
2009/0097247 A1* 4/2009 Tseng et al. .................. 362/241

FOREIGN PATENT DOCUMENTS

| JP | 2006-302711 | 11/2006 |
| JP | 2007-59075 | 3/2007 |
| JP | 2007-207527 A | 8/2007 |
| JP | 2007-324042 | 12/2007 |
| JP | 2008-192313 A | 8/2008 |
| JP | 2008-226707 A | 9/2008 |
| JP | 2009-021132 A | 1/2009 |
| JP | 4274107 | 3/2009 |

OTHER PUBLICATIONS

Japanese Office Action dated Jul 26, 2011 with an English translation.

* cited by examiner

VEHICLE HEADLAMP

RELATED APPLICATIONS

The present application claims priority from Japanese Patent Application No. 2009-072605 filed on Mar. 24, 2009 and the subject matter of which is incorporated herein by reference.

The present invention relates to improvements of a vehicle head lamp.

There is a vehicle head lamp provided with a plurality of light source units. JP-A-2006-302711 and JP-A-2007-324042 discloses related vehicle lamp that is provided with a projector type light source unit and a reflective type light source unit while the projector type light source unit and the reflective type light source unit are arranged in a vertical direction. In the configuration of JP-A-2006-302711, the improvement of a positioning precision is aimed by integrally forming a plurality of reflective surfaces and an ornamental member in the projector type light source unit. Also, the light source parts are prevented from being seen from a front side by disposing the light source parts of both light source units at a rear side of a shade of the projector type light source unit. In the configuration of JP-A-2007-324042, improvements in heat dissipation character and light distribution character are aimed by supporting both light source unit by a single metal supporter. On the other hand, JP-A-2007-059075 discloses a vehicle head lamp that is provided with two reflective type light source units arranged in a vertical direction. In the configuration of JP-A-2007-059075, the light source parts are prevented from being seen from outside by arranging a cover with a reflective surface in front of the light source parts of the light source units. Also, in the configuration of JP-A-2007-059075, miniaturization of the device is aimed while preventing dark view due to a shadow caused by the cover by reflecting light output from the light source parts.

In the configurations of JP-A-2006-302711 and JP-A-2007-324042, since a projector type light source unit is used, a light efficiency is deteriorated due to a light dissipation caused by the projection lens. Also, in general, the projector type light source unit needs a projection lens and the reflective type light source unit does not need a projection lens. Therefore, the number of the parts of the projector type light source unit is larger than that of the reflective type light source unit. In order to reduce the number of parts, the reflective type light source unit may substitute for the projector type light source unit. Under such a substitution, however, since the shade is not provided in the reflective light source unit, the light source part is seen from outside in the configuration of JP-A-2006-302711. If the cover to conceal the light source part as described in JP-A-2007-059075, the appearance of the light source unit is deteriorated because of a lack of unified appearance due to isolation of the cover from other ornamental members when observed from the outside. Also, a manufacturing cost increases and workability in the assembling processes is deteriorated since the number of the parts increases.

Accordingly, the exemplary embodiments of the present invention address above mentioned problems and may address problems not mentioned above. Especially, the exemplary embodiments of the present invention improve the light efficiency and achieve a unified and good appearance of a vehicle head lamp. Also, the exemplary embodiments of the present invention reduce the number of the parts.

SUMMARY

The first aspect of the exemplary embodiment of the present invention is a vehicle head lamp comprising: a first low beam member including a first light source part; a second low beam member including a second light source part, wherein the first low beam member and the second low beam member are arranged in a vertical direction and are both reflective type; a first frame including a partition, the first frame supporting the first low beam member and the second low beam member, and the partition separating the first low beam member and the second low beam member; and a storage provided in a rear side of the partition, the storage accommodating the first and the second light source parts.

Since the first low beam member and the second low beam member are both reflective type, the light efficiency is improved as compared to the case where the projector type is used. Also, the respective light source parts of the first low beam member and the second low beam member are accommodated in the storage provided in the rear side of the partition. The partition is a portion of the frame supporting the first and the second beam members. In other words, the partition covers the respective light source parts of the first and the second beam members. Accordingly, the partition acts as an ornamental member, and the light source parts are prevented from being seen from the outside without providing a cover or the like. Since the partition as a portion of the frame conceals the light source parts, the vehicle head lamp obtains integrality and a good appearance as compared to the case where an additional cover or the like is provided.

DETAIL DESCRIPTION OF THE EXEMPLARY EMBODIMENTS

A vehicle head lamp according to the exemplary embodiment of the present invention is provided with a first low beam member and a second low beam member. The first low beam member and the second low beam member are configured from a reflective type light source unit respectively. The reflective type light source unit is provided with a light source and a reflector, and outputs the light by reflecting the light emitted from the light source with the reflector in a predetermined direction. As a light source unit different from the reflective type light source unit, there is a projector type light source unit. The projector type light source unit is provided with a projection lens and a shade in addition to the light source and the reflector. Since the reflective type light source unit does not use the projection lens, the reflective type light source unit has a light dissipation smaller than that of the projector type light source unit. Therefore, the light efficiency is improved if the reflective type light source unit is used for the first low beam member and the second low beam member.

The first low beam member and the second low beam member are supported by a frame. The frame is provided with a partition to separate the first low beam member and the second low beam member. At the rear side of the partition, the respective light source parts of the first low beam member and the second low beam member are positioned. Therefore, the light source parts are concealed not so as to be seen from the outside by the partition acting as an ornamental member. It is preferable that the frame is arranged on the whole periphery of the first low beam member and the second low beam member. The reason is that the vehicle head lamp obtains a unified and good appearance since the partition concealing the light source parts and the frame as a whole obtains more unified appearance and the partition becomes less conspicuous. Also, it is preferable to integrally form the frame supporting the high beam member and the frame supporting the first and the second low beam members. The reason is that the vehicle head lamp obtains a unified and good appearance because of further enhanced unified appearance of the partition and the frame as a whole. Exemplary embodiments of the present invention are explained below with reference to the drawings.

First Exemplary Embodiment

Figure 1:
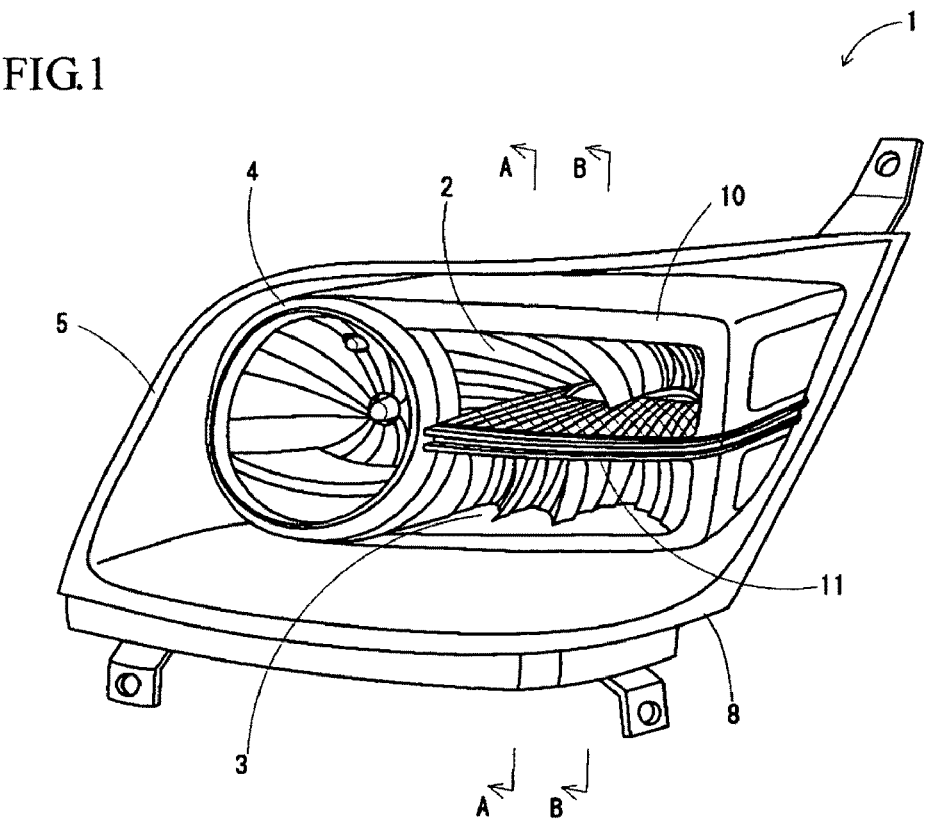
FIG. 1 is a perspective view of the vehicle head lamp according to the exemplary embodiment.

A vehicle head lamp 1 according to the first exemplary embodiment is shown in FIG. 1. The vehicle head lamp 1 is provided with a first low beam member 2, a second low beam member 3, and a high beam member 4. The vehicle head lamp 1 is further provided with a frame 10 forming an ornamental surface to be seen from the outside. The frame 10 is integrally formed around the whole periphery of the first low beam member 2, the second low beam member 3, and the high beam member 4. The first low beam member 2, the second low beam member 3, and the high beam member 4 are attached to a housing 8 by fitted to a housing 8 and supported by the frame 10. An outer lens 5 is attached to the housing 8 and the outer lens 5 covers light output sides of the respective beam members. The frame 10 arranges the first low beam member 2 and the second low beam member 3 in a vertical direction and is provided with the partition 11 extending in a horizontal direction between the first low beam member 2 and the second low beam member 3. According to the partition 11, the first low beam member 2 and the second low beam member 3 are observed while separated in upside and downside respectively.

Figure 2A:
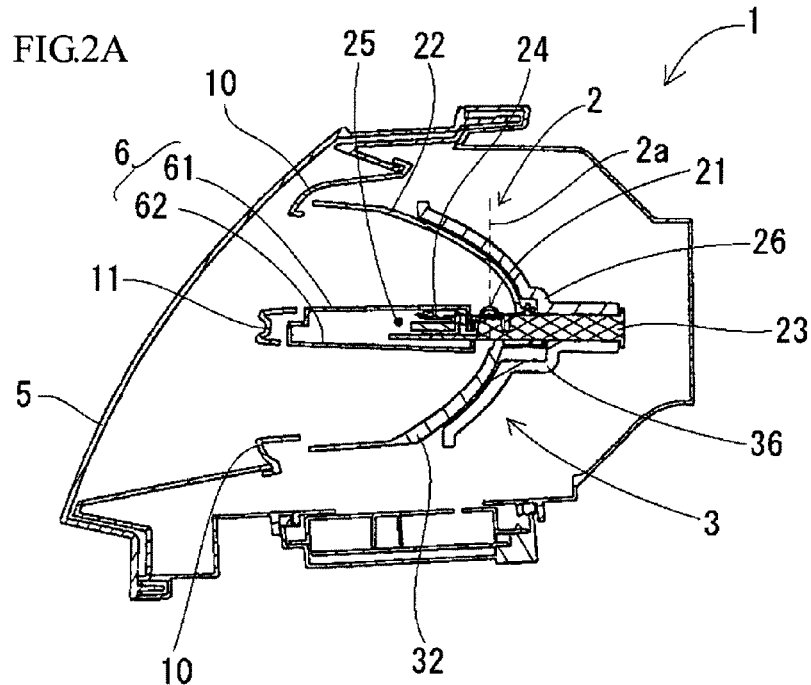
FIG. 2A is a cross sectional view of the vehicle head lamp shown in FIG. 1 along A-A line.
Figure 2B:
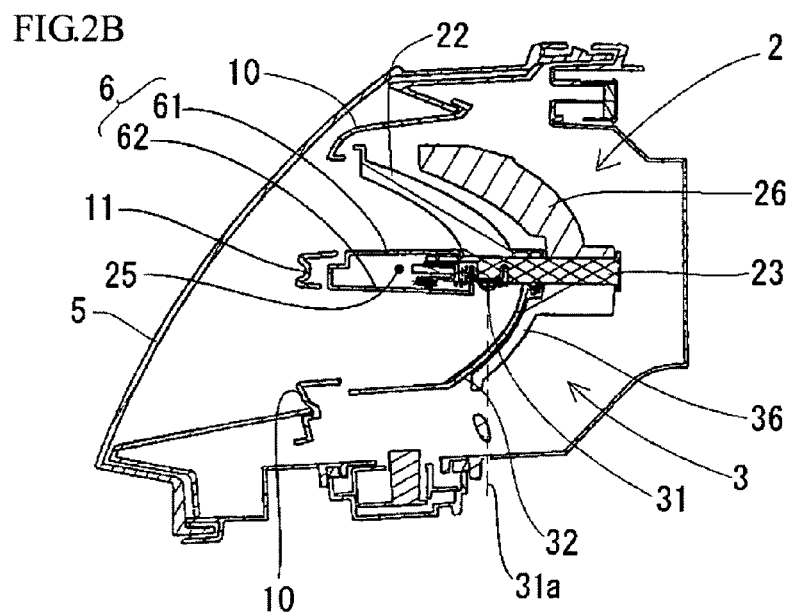
FIG. 2B is a cross sectional view of the vehicle head lamp shown in FIG. 1 along B-B line.

A cross sectional view along A-A line in FIG. 1 is shown in FIG. 2A and a cross sectional view along B-B line in FIG. 1 is shown in FIG. 2B. As shown in FIG. 2A, the first low beam member 2 is provided on the upper side of the partition 11. The first low beam member 2 has a reflective type configuration and is provided with a light source part 21 and a reflector 22. In the rear side of the partition 11, a heat spreader 23 made from aluminum is provided. The light source part 21 is disposed on the upper surface of the heat spreader (heat diffusion plate) 23 so that the optical axis 21a of the light source part 21 is perpendicular to an output direction (left direction in FIG. 2) of the vehicle head lamp 1. The reflector 22 has a dome shape which is an assembling of a plurality of parabolas. The inner surface of the reflector 22 is a reflective surface formed by aluminum deposition. The reflector 22 is provided with the light output side of the light source part 21 so as to reflect the light from the light source part 21 in the output direction. The light source part 21 is connected with a harness 25. The light source part 21 and the harness 25 are accommodated in the storage 6. The storage 6 is formed from an upper cover 61 and a lower cover 62, and is positioned at the rear side of the partition 11. The thickness of the storage 6 is substantially same as the vertical width of the partition 11. The upper surface of the upper cover 61 is a reflective surface formed by aluminum deposition, and the reflective surface reflects the light from the light source 21. A heat sink 26 is provided on the back surface side of the reflector 22. The heat sink 26 has a shape along with the back surface of the reflector 22, and the large contact area with the reflector 22 is secured.

On the other hand, as shown in FIG. 2B, the second low beam member 3 is provided on the lower side of the partition 11. The second low beam member 3 has a reflective type configuration and is provided with a light source part 31 and a reflector 32 of a dome shape as same as the first low beam member 2. The light source 31 is disposed on the lower surface of the heat spreader 23 so that the optical axis 31a of the light source part 31 is perpendicular to the output direction of the vehicle head lamp 1. The reflector 32 has a dome shape which is an assembling of a plurality of parabolas. The inner surface of the reflector 32 is a reflective surface formed by aluminum deposition. The reflector 32 is provided on the light output side of the light source part 21 so as to reflect the light emitted from the light source part 31 in the output direction. The light source part 31 is connected with the harness 25. The light source part 31 is accommodated in the storage 6 as same as the light source part 21 and the harness 25. A heat sink 36 is provided on the back surface of the reflector 32. The heat sink 36 has a shape along with the back surface of the reflector 32, and the large contact area with the reflector 32 is secured.

Figure 3:
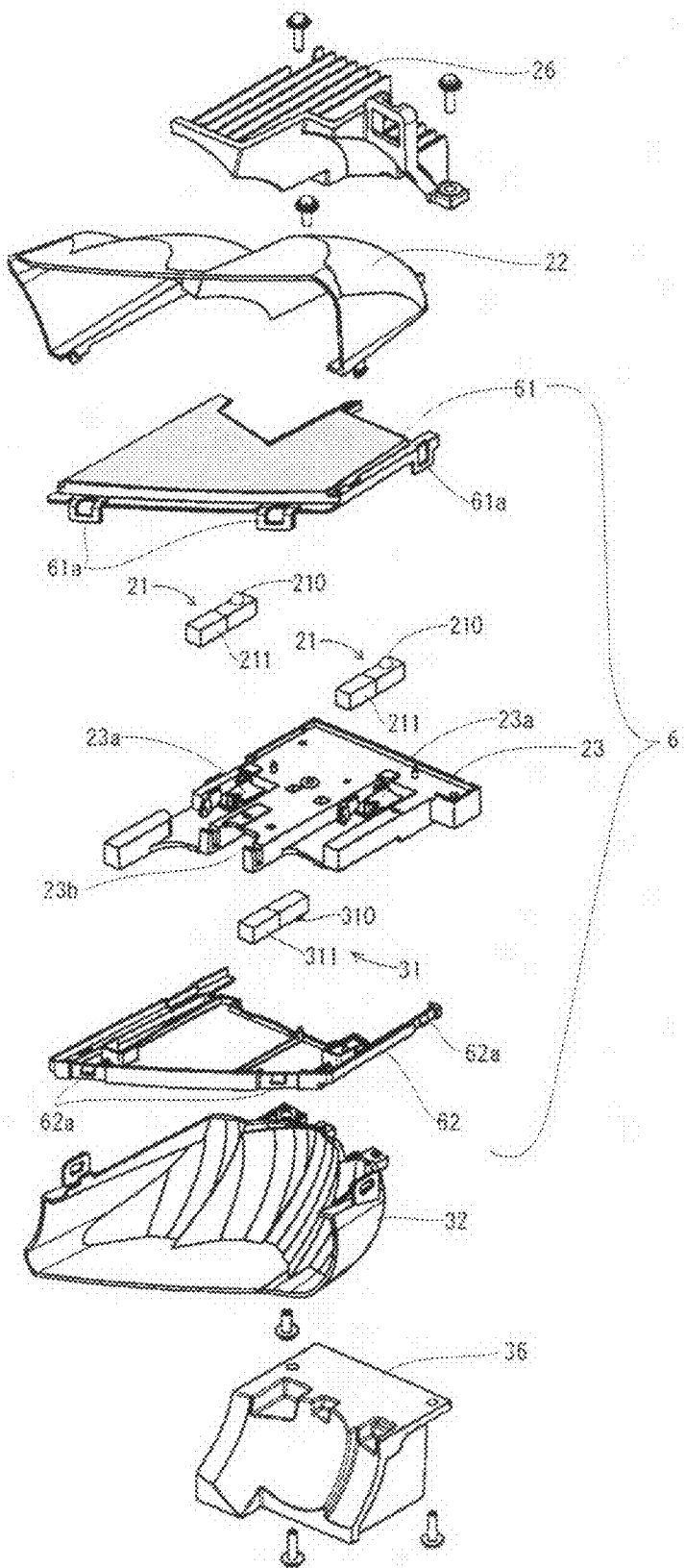
FIG. 3 is a exploded perspective view of the first low beam member and the second low beam member.

FIG. 3 shows an exploded perspective view of the first low beam member 2 and the second low beam member 3. The configuration of the first low beam member 2 and the second low beam member 3 are explained below more detail with reference to FIG. 3. Two light source parts 21 are provided for the first low beam member 2. Each light source part 21 is provided with LED lamp 210, a LED holder 211, and a lead frame (not shown). The LED lamp 210 is a white illumination LED lamp and the LED lamp 210 is supported by the LED holder 211 with the lead frame. On the upper surface of the heat spreader 23, two recesses 23a formed in a shape consistent with the shape of the LED holder 211 are provided. Each light source part 21 is fitted to the recess 23a so as to be attached to the heat spreader 23. The LED holder 211 is connected with the harness 25 (not shown in FIG. 3).

On the other hand, one light source part 31 is provided for the second low beam member 3. The light source part 31 has a same configuration as the light source parts 21 and is provided with a LED lamp 310, a LED holder 311, and a lead frame (not shown). On the lower surface of the head spreader 23, a recess 23b formed in a shape consistent with the shape of the LED holder 311 is provided. The light source part 31 is fitted to the recess 23b so as to be attached to the heat spreader 23. The LED holder 310 is connected with the harness 25 (not shown in FIG. 3).

Thus, the light source parts 21, 31, which are attached to the heat spreader 23, are connected with the harness 25 and the light source parts 21, 31 and the harness 25 are accommodated in the storage 6. The storage 6 has an upper cover 61 provided with three hooks 61a and a lower cover 62 provided with projections 62a which are correspondingly positioned to respective hooks 61a. According to the engagement between the hooks 61a and the projections 62a, the storage 6 is attached so that the upper cover 61 and the lower cover 62 sandwich the heat spreader 23.

Figure 4:
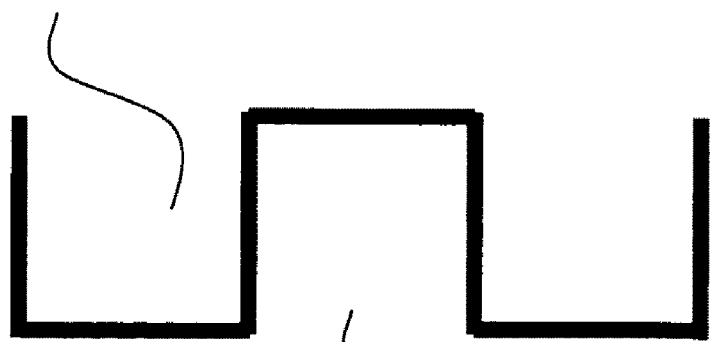
FIG. 4 is a schematic view of the structure of recesses in the exemplary embodiment.

The heat spreader 23 has two recesses 23a on the first surface thereof and one recess 23b on the second surface thereof. Each recess 23a holds the light source parts 21. The recess 23b holds the light source part 31. When the heat spreader 23 is viewed from the front side of the head lamp 1, the recesses 23a, 23b are alternately positioned. The structure of recesses 23a, 23b is schematically described in FIG. 4. According to this recess structure of heat spreader 23, since the heat spreader 23 is thinner than a related art where the recesses are provided so that two recesses are provided on the first surface adjacently and one recess is provided on the second surface independently. Since the heat spreader 23 is thin, the storage 6 and the partition 11 can be made thinner. Thus, the unified appearance of the first and the second low beam members 2, 3 is enhanced.

Also, as the recesses 23a, 23b hold the light source parts 21, 31 so as to be aligned in a transverse direction when viewed from the front side of the head lamp 1 (in other words, substantially perpendicular to a vertical direction in which the first low beam member 2 and the second low beam member 3 are arranged.). Accordingly, the light source parts 21, 31, which are also heat source, are arranged in a spatially expanded manner. Therefore, the heat from the light source parts 21, 31 dissipates in plane and thereby the heat dissipation is enhanced.

According to the vehicle head lamp 1 of above described configuration, the storage 6 accommodating the light source parts 21, 31 and the harness 25 is provided on the rear side of the partition 11 of the frame 10. Since the thickness of the storage 6 is substantially same as the vertical width of the partition 11, the storage 6 is concealed by the partition 11 and the storage 6 is prevented from being seen from the outside by the partition 11 acting as an ornamental member. Also, since the partition 11 is a portion of the frame 10, the partition 11 concealing the storage 6 is not so conspicuous. Therefore, the frame 10 is unified as a whole in appearance thereof and obtains integrity as a whole and a good appearance. Also, since the frame 10 is formed along the whole periphery of the first low beam member 2 and the second low beam member 3, the partition 11 and the frame 10 is unified as a whole in appearance thereof and obtains integrity as a whole and a good appearance. Also, the frame 10 is formed along the whole periphery of the high beam member 4, the unification in appearance is improved and a good appearance is obtained. Also, since it is not necessary to provide a cover or the like in order to conceal the storage 6, the number of the parts is reduced and there is an advantage with respect to the manufacturing cost. Also, the workability in assembling processes is improved. Also, since the storage 6 accommodates the harness 25, the vehicle head lamp is miniaturized.

Since the first low beam member 2 and the second low beam member 3 are both reflective type, the light efficiency is improved as compared to the case where the projector type is used. Also, since the upper surface of the upper cover 61 of the storage 6 is a reflective surface, a shade caused by the storage 6 is prevented and it is prevented to deteriorate the light efficiency.

Also, the heat sinks 26, 36 respectively have a shape consistent with the shape of the back surface of the reflectors 22, 32, and the large contact areas between the heat sinks 26, 36 and the reflectors 22, 32 are secured. Therefore, heat dissipation is improved because the heat dissipation in the light source parts 21, 31 is promoted. Also, since the light source parts 21, 31 are supported by the heat spreader 23, heat dissipation is improved.

INDUSTRIAL APPLICABILITY

The vehicle head lamp according to the exemplary embodiments of the present invention can be used for a various kinds of vehicles.

The invention claimed is:
1. A vehicle head lamp, comprising:
a first low beam member including a first light source part;
a second low beam member including a second light source part, wherein the first low beam member and the second low beam member are arranged in a vertical direction and both comprise a reflective type light source unit;
a first frame including a partition, the first frame supporting the first low beam member and the second low beam member, and the partition separating the first low beam member and the second low beam member; and
a storage provided in a rear side of the partition, the storage accommodating the first and the second light source parts,
wherein the storage comprises a heat spreader, the heat spreader comprising:
a first recess formed on a first surface of the heat spreader, the first recess holding the first light part;
a second recess formed on a second surface of the heat spreader, the second recess holding the second light part, wherein the first recess and the second recess are arranged in a transverse direction substantially perpendicular to the vertical direction part.
2. The vehicle head lamp according to claim 1, wherein the first frame is provided in a whole periphery of the first low beam member and the second low beam member.
3. A vehicle head lamp, comprising:
a first low beam member including a first light source part;
a second low beam member including a second light source part, wherein the first low beam member and the second low beam member are arranged in a vertical direction and both comprise a reflective type light source unit;
a first frame including a partition, the first frame supporting the first low beam member and the second low beam member, and the partition separating the first low beam member and the second low beam member;
a storage provided in a rear side of the partition, the storage accommodating the first and the second light source parts; and
a high beam member comprising a second frame, wherein the first frame and the second frame are integrally formed.
4. The vehicle head lamp according to claim 1, wherein a thickness of the storage is same as a thickness of a vertical width of the partition.
5. A head lamp, comprising:
a first frame;
a storage horizontally configured within the first frame to accommodate a first low beam member and a second low beam member within the first frame, the first low beam member and the second low beam member being arranged vertically with respect to the storage; and
a partition extending in a horizontal direction in front of the storage between the first low beam member and the second low beam member,
wherein the first low beam member and the second low beam member both comprise a reflective type light source unit,
wherein the first light source part is provided in a first recess defined in an upper surface of the storage,
wherein the second light source part is provided inside a recess defined in a lower surface of the storage, wherein the first recess and the second recess are arranged in a transverse direction substantially perpendicular to the vertical direction.
6. The head lamp according to claim 5, further comprising: a second frame integrally formed with the first frame; and a high beam member provided within the second frame.
7. The head lamp according to claim 5, wherein the first low beam member comprises a first reflector and a first light source part, an inner surface of the first reflector being formed in a dome shape and comprising a reflective surface arranged to reflect light emitted from the first light source part to an output direction.

8. The head lamp according to claim 7, wherein the first low beam member is provided on an upper surface of the storage.

9. The head lamp according to claim 7, wherein the storage comprises a heat spreader, and
wherein the first light source part is disposed in the first recess on an upper surface of the heat spreader so that an optical axis of the first light source part is perpendicular to an output direction of the head lamp.

10. The head lamp according to claim 9, wherein the second low beam member comprises a second reflector and a second light source part,
wherein the second light source part is disposed in the second recess on a lower surface of the heat spreader so that an optical axis of the second light source part is perpendicular to the output direction of the head lamp.

11. The head lamp according to claim 5, wherein the second low beam member comprises a second reflector and a second light source part, an inner surface of the second reflector being formed in a dome shape and comprising a reflective surface arranged to reflect light emitted from the second light source part to an output direction.

12. The head lamp according to claim 11, wherein the second low beam member is provided on a lower surface of the storage.

13. The head lamp according to claim 11, wherein the storage comprises a heat spreader, and
wherein the second light source part is disposed in the second recess on a lower surface of the heat spreader so that an optical axis of the second light source part is perpendicular to an output direction of the head lamp.

14. The head lamp according to claim 13, wherein the first low beam member comprises a first reflector and a first light source part, and
wherein the first light source part is disposed in the first recess on an upper surface of the heat spreader so that an optical axis of the first light source part is perpendicular to an output direction of the head lamp.

15. The head lamp according to claim 5, wherein the storage comprises a first heat sink, the first heat sink being provided on a back surface of the first reflector.

16. The head lamp according to claim 5, wherein the storage comprises a second heat sink, the second heat sink being provided on a back surface of the second reflector.

17. The head lamp according to claim 5, wherein the storage comprises an upper cover and a lower cover,
wherein an upper surface of the upper cover comprises a reflective surface, and
wherein a lower surface of the lower cover comprises a reflective surface.

* * * * *